Aug. 2, 1932.  A. C. CARY, 3D  1,869,999
AUTOMATIC STOP MECHANISM CONTROL
Filed Feb. 7, 1928  2 Sheets-Sheet 1

Alexander Claxton Cary 3d
INVENTOR
BY Frank P. Wentworth
his ATTORNEY

Aug. 2, 1932.   A. C. CARY, 3D   1,869,999
AUTOMATIC STOP MECHANISM CONTROL
Filed Feb. 7, 1928   2 Sheets-Sheet 2

Alexander Claxton Cary 3d
INVENTOR
BY
ATTORNEY

Patented Aug. 2, 1932

1,869,999

UNITED STATES PATENT OFFICE

ALEXANDER CLAXTON CARY, 3D, OF LARCHMONT, NEW YORK, ASSIGNOR TO AMERICAN BANK NOTE COMPANY, OF NEW YORK, N. Y., A CORPORATION OF NEW YORK

AUTOMATIC STOP MECHANISM CONTROL

Application filed February 7, 1928. Serial No. 252,630.

My invention relates to an automatic stop mechanism control, and more particularly to a device of this character capable of being so set that after a predetermined number of actuations thereof by the machine, in connection with which it is used, it will automatically close an electrical circuit and therethrough cause the actuation of other mechanisms resulting in the stoppage of said machine.

In certain types of printing machines, particularly in high grade work, it is desirable to limit the output of a machine to an exact number. This is particularly true in rotary steel plate engraving machines where an overrun is ordinarily not permissible except at a material wastage of expensive material. It is also desirable, however, in connection with other types of machines.

While it is customary in many machines to use counters to permit the determination of the output of a machine, such counters do not have any control over the functioning of the machine, thus introducing into the length of operation of this machine the personal factor, which is unreliable.

With the above conditions in mind, I have provided an automatic stop mechanism control adapted to be actuated from working mechanisms in the machine, which may be so set that upon the completion of a predetermined number of actuations of the machine, an electric circuit will be so controlled as to cause the actuation of other mechanisms in the machine in a manner to interrupt the application of power to the machine and prevent a further production of work. It will be obvious that the construction of this automatic stop mechanism control must be such that the various parts therein cannot co-operate in a manner to cause the stoppage of the machine, except as determined by the setting of the stop mechanism control, and that the construction and arrangement of parts must be such as to secure accuracy in the functioning of the control mechanisms.

While the stop mechanism control may be so constructed as to function as a counter or register to permit the operator or a supervisor to determine the progress of the work being done, this feature is of minor importance as compared with the possibility of limiting the output of the machine by a predetermined setting of the stop mechanism control. It is of no importance, therefore, whether digits be used upon dial plates to assist in an accurate setting of the stop mechanism control, or other means be employed for this purpose, nor is it of importance, if digits be used, whether their arrangement be such as to cause the operation of the machine by an ascending or a descending progression in the movement of these digits.

It is essential, however, that a sequence of members, each carrying circuit controlling devices, be employed, that transfer mechanisms be employed to cause the progressive actuation of these members from a main source of actuation of the stop mechanism control, and that said members and said circuit controlling devices shall be capable of being so set as to ensure accuracy in the relative operation of said members, and the coordination of the various circuit controlling devices only after a predetermined number of actuations of the main actuating mechanism of the stop mechanism control by the working mechanisms of the machine.

The control device herein referred to is particularly designed for use upon printing machines, it being a common practice to drive such machines from an individual motor and to provide a main switch mechanism controlling the application of power to said motor and various controlling switches at different points of the machine to facilitate the stopping and starting thereof while work upon different parts of the machine, incidental to the preparation of the machine for a run, is being done.

So far as the present invention is concerned, it is merely requisite that it be used in connection with an electrically actuated mechanism for controlling the application of power to the machine, whether the source of this power be an electric motor or merely a mechanical drive. In effect, the device of the present application is merely an additional control mechanism for the purpose of ensuring, when desired, the automatic interruption of power to the machine after a predetermined number of actuations thereof.

In recognition of the fact that at times an indeterminate length of run of a machine is required, I so construct the control device of my invention that when desired it may be made totally inoperative to cause the interruption of the application of power to the machine, the reasons for which will more fully appear hereinafter.

The invention consists primarily in an automatic stop mechanism control embodying therein a plurality of circuit controlling devices each including fixed and movable contact members said devices being in series in a circuit from a source, a sequence of rotatable members, each of said rotatable members having associated therewith a movable contact member a main actuating mechanism operative upon one of said rotatable members and adapted to receive impulses from a moving mechanism of a machine with each cycle of operations of said machine, means causing a progressive actuation of said rotatable members, and means whereby said movable member of each circuit controlling device may be operatively connected with, and adjusted in relation to, a rotatable member to predetermine an interval of simultaneous actuation of said circuit controlling devices; and in such other novel features of construction and combination of parts as are hereinafter set forth and described, and more particularly pointed out in the claims hereto appended.

Referring to the drawings.

Like numerals refer to like parts throughout the several views.

Figure 1:
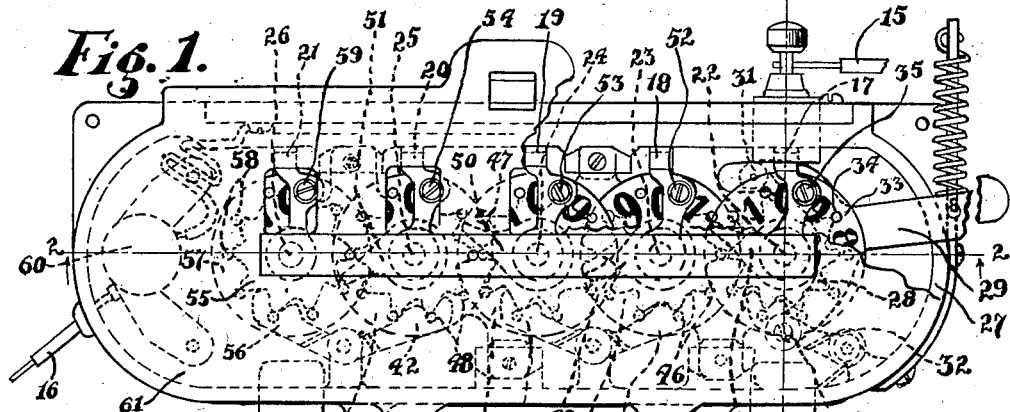
Fig. 1 is a front elevation.
Figure 2:
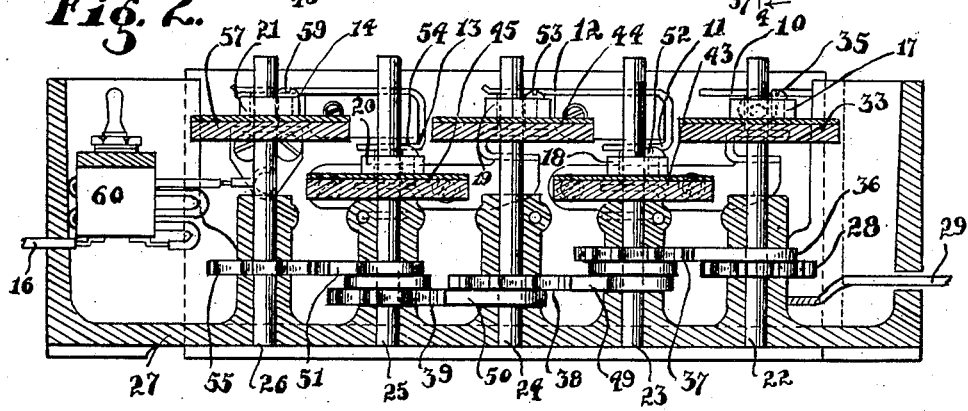
Fig. 2 is a section on the line 2—2 of Fig. 1, looking upwardly.

In the embodiment of the invention shown in the drawings, I employ a plurality of circuit controlling devices consisting of a series of pairs of spaced contacts 10, 11, 12, 13 and 14, arranged in series in an electrical circuit which is ordinarily merely a local circuit of low potential in order to avoid sparking at these contacts with the making or breaking of the circuit controlled thereby.

A lead wire 15 communicates with one of the contacts of the pair 10, and a lead wire 16 communicates with one of the contacts of the pair 14. This circuit controlling mechanism includes a movable member associated with each pair of contacts and consisting of an electro-conductive bridge member supported by an arm of insulating material, the respective movable members being shown at 17, 18, 19, 20 and 21.

Each of the movable members 17 to 21 is actuated by a rotatable member, five of such members 22, 23, 24, 25 and 26 being used in the form of the invention shown. These members are in the form of shafts mounted in suitable bearings in a frame-work 27 and, for convenience of description, will be designated the units shaft, tens shaft, hundreds shaft, thousandths shaft and tens of thousandths shaft. The first of these shafts, 22, is provided with a ratchet or star wheel 28, through which movement is imparted to said shaft by a main actuating mechanism consisting of a swing pawl 29 pivoted at 30 and having a tooth 31 co-operating with the ratchet or star wheel 28. This swing pawl is adapted to be connected in the usual or any desired manner with a mechanism of a machine so as to receive one complete reciprocation during each cycle of operations of the machine necessary to the completion of work upon a single article.

The ratchet or star wheel 28 has ten teeth and is acted upon by a spring pressed detent pawl 32 to minimize likelihood of overrunning of the rotatable member to an extent to interfere with the accuracy of the functioning of the mechanism.

In the form of the invention shown, the movable member 17 is operatively connected with the rotatable member or units shaft 22 by means of a dial wheel 33 having ten graduations indicated thereon and spaced equally apart, means, as the screw threaded openings 34 adjacent each of said graduations, being provided, whereby the member 17 may be not only connected with said dial wheel by means of a screw 35 passing therethrough in a manner to cause it to be actuated thereby, but may be adjusted in relation thereto so as to control the timing of the operative engagement of said member 17 with the contacts 10 with a given setting of the dial wheel. Said dial wheel is carried by and rotatable with the shaft 22.

Also carried by and rotatable with the shaft 22 is an actuating member or tappet 36 of a transfer mechanism by which, upon the completion of each full rotation of said shaft 22, a one-tenth rotation will be imparted to the rotatable member of next higher denomination, the shaft 23.

The rotatable members or shafts 23, 24 and 25 are each provided with a star wheel, detent pawl, dial and transfer member having the same construction and mode of operation as the corresponding parts associated with the rotatable member or shaft 22, said star wheels being shown respectively at 37, 38 and 39; the detent pawls at 40, 41 and 42; the dials at 43, 44 and 45; the screw threaded openings in said dials at 46, 47 and 48, and the transfer mechanism actuating members at 49, 50 and 51.

The movable circuit controlling members 18, 19 and 20 are operatively connected with the rotatable members or the shafts 23, 24 and 25 by means of screws 52, 53 and 54 cooperating respectively with the screw threaded openings in said dials carried by said shafts respectively.

The rotatable member or the shaft 26 of highest denomination carries a star wheel 55 acted upon by a detent pawl 56 and a dial 57 having screw threaded openings 58 therein, by means of which the movable circuit controlling member 21 may be secured and adjusted in relation to the rotatable member or shaft 26 by means of a screw 59.

The construction of the various elements associated with each rotatable member or shaft above referred to, is identical with the same elements carried by other rotatable members or shafts, the sole difference in the arrangement of each shaft and its appurtenances being in the different positioning of these members upon the shaft so as to permit the lapping of the dials in order to permit a shortening of the length of the entire structure.

Arranged in the length of the lead wire 16 is a manually operative switch mechanism 60 of ordinary construction, by means of which the stop mechanism control heretofore described may be made totally inoperative, or may be made operative, at will and independently of the various circuit controlling mechanisms in the device.

All of the mechanisms heretofore described are supported within a housing having a closure 61 provided with sight openings as shown, so that the device may be used as a counter as well as an automatic stop mechanism. The adaptability of the control for use as a counter is due to the fact that the various rotatable members or shafts 22 to 26 are progressively actuated in the same manner as the digit wheels of the ordinary counter, and it is more convenient to have the graduations upon each dial in the form of digits in setting the various movable members 17 to 21. This practice will also permit the control to be used in lieu of the ordinary counter.

By the foregoing it will be noted that there is provided a plurality of circuit controlling devices so arranged as to provide a normally open circuit, and so actuated that the stop mechanism control cannot function until all of these gaps in the circuit are closed by the respective movable members forming parts of the several circuit controlling mechanisms, which can occur only at a time determined by their setting in relation to the other rotatable members and the progressive actuation of said rotatable members.

The main controlling switch mechanism 60 is used mainly for the purpose of interrupting the circuit while setting the device, although when an indeterminate run of the machine is being made it may be also used to avoid a possible accidental stoppage of the machine as a result of a failure to so set the various members 17 to 21 in a manner to avoid this condition arising.

The operation of the herein described automatic stop mechanism control is substantially as follows:—

In describing the operation of the control it will be considered in connection with its operation in conjunction with printing machinery, it being understood that such machines are ordinarily provided with a throwoff mechanism for making the printing couple inoperative in the event of the failure of the feeding mechanism to deliver a sheet thereto, or when it is desired to operate the machine without making an impression. In such machines this throwoff mechanism usually has associated therewith a device which, with the separation of the members of the printing couple, will automatically make the device operative upon the counting mechanism, inoperative. This is true in various machines in which counters are used, and whether the control of my invention be used as a counter or not, interruption of its functioning in the same manner as the ordinary counter is highly desirable.

The present invention, however, relates not to these characteristics of the machines with which the control is used, but to the control itself and the manner of its operating in relation to the mechanism from which it is actuated, and in fact the character of this mechanism is immaterial to the invention which has a wide range of utility so far as different machines or parts of machines with which it may be used is concerned.

In the printing of bank notes, bonds and other securities, the requirement is for a limited number of such, and there is not the usual leeway for an overrun in the production of same which is present in almost every other line of manufacture. In this class of work as in all other kinds of work there is a percentage of imperfect work. It is the ordinary manufacturing practice to allow for this imperfect work by providing for a production in excess of the actual requirements in an amount which experience has shown will compensate for imperfect work, ample allowance being made for the uncertainties of production so as to ensure the completion of at least the number of articles or amount of merchandise required. If the number of imperfect articles is low, then there will be an excess of perfect goods over the requirements, and when the merchandise is specially made, the purchaser ordinarily will accept this excess product, so that there is little or no wastage as a result of overruns in general commercial lines. As stated above, however, in bank notes and securities, in most instances, the delivery must be of an exact amount, and any overrun is wastage of expensive paper, expensive labor and expensive material and is a total loss to the producer.

With the above conditions in mind, the desirability of the control herein described will be readily appreciated.

Assuming that the number of impressions of a given kind which are to be made is 100,000, this would constitute what might be termed an indefinite run, since the machine may be operated for a considerable period without likelihood of an overrun. During the printing of this number of sheets, however, there will be a certain number of imperfect prints which, by rigid inspection, will be separated from the perfect impressions. A machine ordinarily may run for a length of time sufficient to produce the full 100,000 impressions, or even slightly above this, without any fear of an overrun, since there will always be a certain number of imperfect imprints. During this run of the machine there is no need for the use of the stop mechanism control of the invention, and consequently the switch 60 may be set so as to open the circuit to this control, and at the same time, by using digits upon the disks carried by the various rotatable members, an accurate count of the number of impressions may be made in the usual and well known manner. The control may be set, however, so as to cause the stoppage of the machine upon the completion of a long as well as a short run.

With the completion of the run of the machine, however, there will always be a certain shortage in the number of impressions, which will have been determined during the progress of the work. For our present purposes we will assume that this shortage amounts to 9,542 impressions. Consequently the overrun required to secure the complete number of impressions is definite and if, as a matter of policy, it is decided to extend the run beyond this definite amount the percentage of waste can extend only to this final run, and under no circumstances can it be a factor in the entire output of such articles. By this is meant, that wastage which results from an overrun of perfect production.

If the stop mechanism control for the original run of 100,000 impressions has been set upon the initiation of this run, the various movable members 22 to 26 will have brought the various dials 33, 43, 44, 45 and 57 to a position where the various digits 9 thereon will be presented at the top of the dial with the various movable contact members 17, 18, 19, 20 and 21 closing the gap at the contacts 10, 11, 12, 13 and 14 respectively, which condition will have closed the circuit controlled by the various contracts 10 to 14 and thus cause the actuation of the stop mechanism of the machine.

With the parts in this condition it will be necessary to bring all of the shafts 22 to 26 to a position where 0 upon the dials will be upon the upper vertical radius of these dials which will itself open the circuit through the various contacts. The switch 60, however, is provided, so that, if desired, the operator may interrupt the circuit by means of this switch and thus avoid likelihood of sparking when turning any of the shafts 22 to 26. Access is had to the various dials by removing the closure 61 which is hinged to the casing containing the other mechanisms to facilitate such access to the dials.

Figure 5:
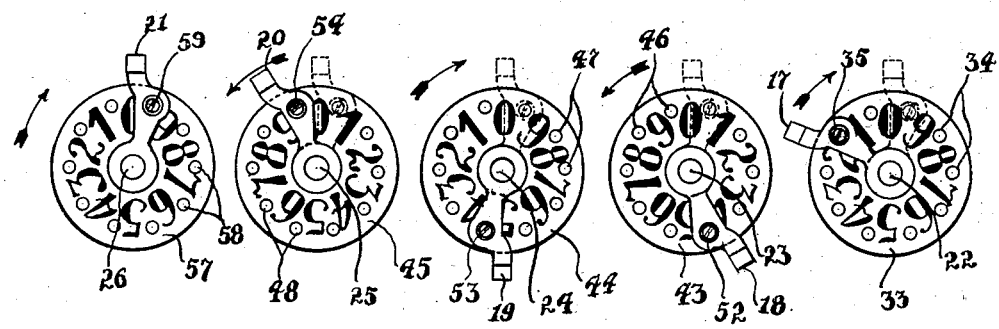
Fig. 5 is a view illustrating the setting and operation of the control.

This setting of the various shafts will bring the various transfer members 36, 49, 50 and 51 to a position where it will require a full rotation of the shaft 22, 23, 24 or 25 to bring this transfer member into its operative relation to the star wheel 37, 38, 39 and 55 respectively so as to impart a one-tenth rotation to the shaft carrying same. The various screws 35, 52, 53, 54 and 59 are then loosened and the movable contact members 17 to 21 set, the member 21 indicating 0 on the dial 57; the member 20 set indicating 9 upon the dial 45; the member 19 set indicating 5 upon the dial 44; the member 18 set indicating 4 upon the dial 43, and the member 17 set indicating 2 upon the dial 33. This is the position of parts shown in full lines in Fig. 5 of the drawings. With this setting it will be noted that the member 21 is engaged with the contacts 14, but that each of the other members is disengaged from said contacts.

With the parts so set, the switch 60 may be closed and the closure 61 also closed. With each ten revolutions of the members 22 to 24 respectively the member of next higher denomination will receive one-tenth revolution, thus causing the actuation of the various members in arithmetical progression. During each rotation of each rotatable member the movable contact member associated therewith will engage its co-operating contact members which, however, will not affect the circuits including these contact members or cause sparking. The circuits can be closed only when there is a simultaneous engagement of the movable contact members with their co-operating contact members, and this can occur only when the progressive actuation of the machine has been such as to bring the character, opposite which the movable contact member is set as to each of the movable members, in a position where the movable member will be engaged with its co-operating contacts.

Assuming the use of digits upon the various dials, this can occur only when the digits 9, 5, 4 and 2 are alined with the upper vertical radius of the various shafts 22 to 25, the 0 and the arm of the remaining rotatable member already being in this position. Hence, notwithstanding that the movable member carried by and movable with each of the rotatable members or shafts will, during the making of the 9,542 impressions, operatively engage the contacts associated therewith, and notwithstanding that at times three of these movable members will actuate their contacts simultaneously, the circuit controlled by the series of contacts will not be closed until the number of actuations of the machine has corresponded with the total number indicated by the setting of the various movable members in relation to the rotatable members or shafts respectively.

It will readily be understood that the construction heretofore described will permit the setting of the control for any desired number of actuations, and that this capability of predetermining the number of actuations of the machine in connection with which the control is used, before there can be an automatic stoppage of the application of power to the machine, is the primary object and an essential characteristic of the invention.

Figure 3:
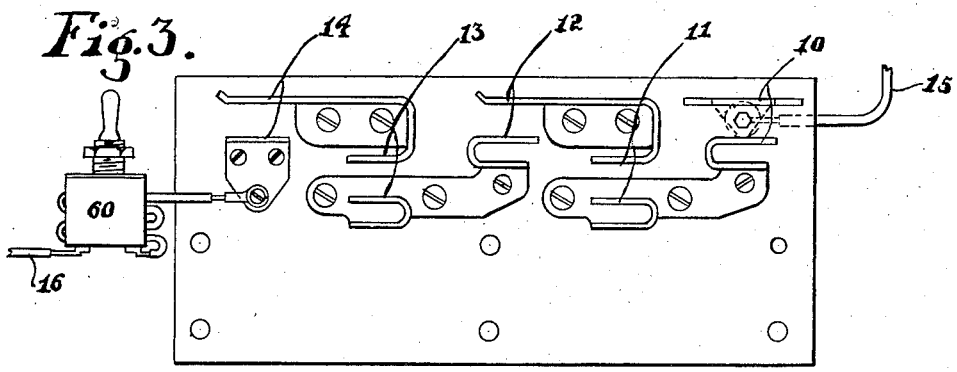
Fig. 3 is a detail view of the electrical contact arrangement.
Figure 4:
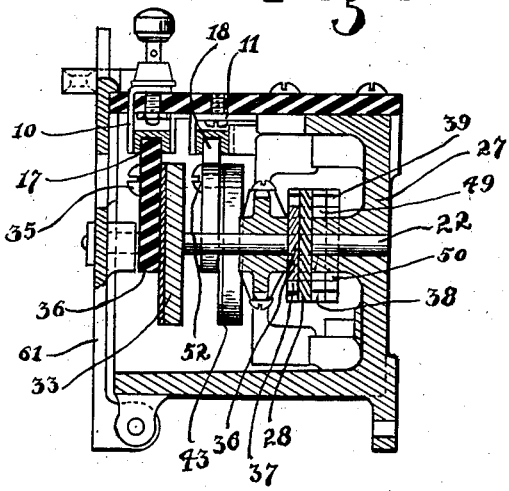
Fig. 4 is a section on the line 4—4 of Fig. 1.

It is obvious that the members of each pair of spaced contacts 10 to 14 must be insulated from each other, and that one of the contacts of each pair must be electrically connected with one of the contacts of the adjacent pair so as to secure a series coupling of the various circuit controls. In the construction shown in the drawings, this is done by mounting the various contacts on a plate of insulating material and having each of these plates, excepting those connected with the lead wires 15—16, support and electrically connect contacts of adjacent pairs, as shown more particularly in Figs. 3 and 4 of the drawings. The construction and arrangement of these contacts, however, is immaterial to the invention and may take a wide variety of different forms so long as the movement of the co-operating movable member in relation thereto will be such as to close the circuit at each pair of contacts as required in the operation of the control.

In the operation of a control embodying the invention, notwithstanding the simplicity of the various transfer mechanisms shown, there will be sufficient accuracy to accomplish the purposes of the invention. The detent pawls acting upon the various star wheels will prevent any material overrunning of any of the rotatable members 22 to 26 upon the application of power thereto through the transfer mechanisms, but slight overrunning is permissible since there can be no cumulative error where the various rotatable members are not actuated through entrained gears.

While the construction and arrangement of the various parts of the control as shown in the accompanying drawings is desirable because of the simplicity and compactness of these parts, it is obvious that the desired progressive movements of the various rotatable members may be secured by a number of mechanisms securing the same operative effect.

It is therefore not my intention to limit the invention to the precise details of construction shown in the drawings, since such may be varied without departing from the spirit and scope of the invention.

Having described the invention, what I claim as new and desire to have protected by Letters Patent, is:—

1. An automatic stop mechanism control embodying therein a plurality of spaced pairs of contacts, one of the contacts of each pair being electrically connected with a contact of an adjacent pair, means electrically connecting one of the contacts of the first and last pair with an electrical source, a plurality of movable members adapted to bridge the gap between and electrically connect the contacts of each pair, a sequence of rotatable members, each of said rotatable members having associated therewith a movable contact member a main actuating mechanism operative upon one of said rotatable members and adapted to receive impulses from a moving mechanism of a machine with each cycle of operations of said machine, means causing a progressive actuation of said rotatable members, and means whereby the movable member associated therewith may be operatively connected with, and adjusted in relation to, a rotatable member to predetermine an interval of simultaneous actuation of said circuit controlling devices.

2. An automatic stop mechanism control embodying therein a sequence of rotatable shafts, dials carried by and rotatable with said shafts respectively, each of said dials having ten graduations indicated thereon and spaced equally apart, an arm idly mounted on each of said shafts adjacent the dial on said shaft, co-operating means operative upon each of said arms and upon the adjacent dial, whereby said arm may be set adjacent any of the graduations upon and connected to have movement with said dial, a main actuating mechanism operative upon one of said shafts adapted to receive impulses from a moving mechanism of a machine with each cycle of operations of said machine, co-operating means carried by said shafts respectively, whereby said shafts are progressively actuated, and a plurality of circuit controlling devices adapted to co-operate with said arms respectively said devices being in series in a circuit from a source, whereby the interval of the simultaneous actuation of said circuit controlling devices by said arms may be predetermined by the setting of said arms.

3. An automatic stop mechanism control embodying therein a sequence of rotatable shafts, dials carried by and rotatable with said shafts respectively, each of said dials having ten graduations indicated thereon and spaced equally apart, an arm idly mounted on each of said shafts adjacent the dial on said shafts, co-operating means operative upon each of said arms and upon the adjacent dial, whereby said arm may be set adjacent any of the graduations upon and connected to have movement with said dial, a main actuating mechanism operative upon one of said shafts adapted to receive impulses from a moving mechanism of a machine with each cycle of operations of said machine, co-operating means carried by said shafts respectively, whereby said shafts are progressively actuated, a plurality of spaced pairs of contacts, one of the contacts of each pair being electrically connected with a contact of an adjacent pair, means electrically connecting one of the contacts of the first and the last pair with an electrical source, and a contact member carried by each of said arms adapted to bridge the gap between and electrically connect the contacts of the pair with which it co-operates.

In witness whereof I have hereunto affixed my signature this 2nd day of February, 1928.

ALEXANDER CLAXTON CARY, 3D.